US006951896B2

(12) United States Patent
Ottenheijm

(10) Patent No.: US 6,951,896 B2
(45) Date of Patent: Oct. 4, 2005

(54) FLAME-RETARDANT THERMOPLASTIC COMPOSITION WITH IMPROVED PROPERTIES

(75) Inventor: Johannes H. G. Ottenheijm, Born (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/104,051

(22) Filed: Mar. 25, 2002

(65) Prior Publication Data

US 2003/0055152 A1 Mar. 20, 2003

Related U.S. Application Data

(63) Continuation of application No. PCT/NL00/00647, filed on Sep. 12, 2000.

(30) Foreign Application Priority Data

Sep. 24, 1999 (NL) ............................................ 1013134

(51) Int. Cl.[7] ......................... C08K 5/34; C08K 5/3492

(52) U.S. Cl. ....................... 524/100; 524/116; 524/195; 524/237; 524/381; 524/382; 524/405; 524/409; 524/410; 524/411; 524/412; 524/414; 524/416; 524/430; 524/431; 524/432; 524/436; 524/437; 524/494; 524/514

(58) Field of Search ................................ 524/100, 116, 524/195, 237, 381, 382, 405, 410, 431, 432, 436, 437, 414, 416, 409, 411, 412, 430, 494, 502, 513, 514

(56) References Cited

U.S. PATENT DOCUMENTS

| | | | | | |
|---|---|---|---|---|---|
| 3,058,941 | A | * | 10/1962 | Birum | 524/123 |
| 3,519,597 | A | * | 7/1970 | Weil et al. | 524/462 |
| 3,634,311 | A | * | 1/1972 | Peterson et al. | 524/409 |
| 3,728,304 | A | * | 4/1973 | Hirao et al. | 524/137 |
| 3,775,516 | A | * | 11/1973 | Hindersinn | 524/467 |
| 3,787,356 | A | * | 1/1974 | Gourse | 524/405 |
| 3,950,458 | A | * | 4/1976 | Noetzel et al. | 558/203 |
| 4,010,225 | A | * | 3/1977 | Noetzel et al. | 524/130 |
| 4,369,264 | A | * | 1/1983 | Baumann et al. | 523/209 |
| 4,847,322 | A | * | 7/1989 | Akkapeddi et al. | 525/10 |
| 5,156,775 | A | * | 10/1992 | Blount | 252/609 |
| 5,182,163 | A | * | 1/1993 | Wheat et al. | 442/203 |
| 5,236,982 | A | * | 8/1993 | Cossement et al. | 524/188 |
| 5,883,182 | A | * | 3/1999 | Hunt | 524/525 |
| 6,040,370 | A | * | 3/2000 | Wozny et al. | 524/394 |

FOREIGN PATENT DOCUMENTS

| | | |
|---|---|---|
| EP | 144 175 | 6/1985 |
| EP | 381 172 | 8/1990 |
| EP | 401 740 | 12/1990 |
| EP | 802 268 | 10/1997 |
| EP | 866 097 | 9/1998 |
| WO | 95/18178 | 7/1995 |

* cited by examiner

*Primary Examiner*—Judy M. Reddick
(74) *Attorney, Agent, or Firm*—Mayer, Brown, Rowe & Maw LLP

(57) ABSTRACT

The invention relates to a flame-retardant thermoplastic composition which comprises at least (A) a thermoplastic polymer and (B) a flame-retardant system and which also contains (C) an n-alkanelactam-substituted polymer. Such a composition shows both a good flame retardancy, in particular a short afterflame time and little dripping, and also excellent mechanical properties. In particular, the n-alkanelactam-substituted polymer is a polyolefine, substituted with n-alkanelactam groups, with n being chosen from between 2 and 12. More in particular, the n-alkanelactam is polyvinyl pyrrolidone. Preferably, the thermoplastic polymer is a polycondensation polymer, in particular a polyamide, a polyester or a polycarbonate. Particularly suitable for use as the polyamide are PA-6, PA-6,6, PA-4,6 and semi-aromatic polyamides. The flame-retardant system may be both a halogen-containing and a halogen-free system. Preferably, the flame-retardant system comprises a halogen-containing compound and an antimony-containing compound.

17 Claims, No Drawings

FLAME-RETARDANT THERMOPLASTIC COMPOSITION WITH IMPROVED PROPERTIES

CROSS REFERENCE TO RELATED APPLICATION

This application is a continuation of International Application PCT/NL00/00647 filed Sep. 12, 2000, and is hereby incorporated by reference in its entirety.

The invention relates to a flame-retardant thermoplastic composition that comprises (A) a thermoplastiic polymer and (B) a flame-retardant system.

Such a composition is inter alia known from WO-95/18178 (DuPont), describing a polyamide composition which contains a combination of a brominated polystyrene and sodium antimonate as a flame-retardant system. Thermoplastic polymers are usually insufficiently flame-retardant per se, except for, for example, completely aromatic polyamides, for example aramide, and in practice a thermoplastic polymer is hence used in combination with a flame-retardant system consisting of one or more flame retardants and one or more synergists, i.e. compounds that promote the flame retardancy.

The disadvantage of such a composition is that the flame-retardant system has such an adverse effect on the composition's properties, in particular the mechanical, thermal, electrical and processing properties, that the amount of the flame-retardant system used is a compromise between on the one hand the required flame retardancy, for example for obtaining a V0 classification according to the UL-94 test of Underwriters Laboratories, and on the other the composition's required mechanical, thermal, processing and electrical properties. For example, the presence of antimony trioxide leads to thermal degradation of the composition at high processing temperatures, in particular at temperatures above 280° C., which among other things leads to discolouration, fouling of the mould and corrosion of the processing equipment. In practice, the smallest possible amount of flame-retardant system is used in a thermoplastic composition and a certain degree of dripping is accepted in the UL-94 test.

The aim of the invention is hence to provide a thermoplastic composition with good flame-retardant, thermal, processing and mechanical properties, in particular at a high temperature, more in particular at a temperature above 280° C.

The inventors have now surprisingly found that a flame-retardant thermoplastic composition that comprises at least (A) a thermoplastic polymer and (B) a flame-retardant system and that also contains (C) an n-alkanelactam-substituted polymer, shows both a good flame retardancy, particular a short after-flame time, more particular a short total after-flame time and excellent mechanical properties. After-flame time is defined according to the UL-94 test as the time a test specimen burns till extinction after a flame application has stopped. Total after-flame time is the combined time ($t_1+t_2$) for 5 specimen in which $t_1$ is the after-flame time after a first flame application and $t_2$ is the after-flame time after a second flame application.

As an added advantage of the composition according to the invention it was found that the dripping according to UL-94 could be greatly reduced, in particular in compositions according to the invention that also contain glass fibres. On account of the increasingly stringent requirements that are being imposed with respect to flame-retardant compositions, minimal dripping, preferably the absence of dripping, is most desirable.

Another advantage of the composition according to the invention is that the amount of synergist, in particular the amount of antimony compound in halogen-containing flame-retardant systems can be reduced without the flame retardancy of the composition being adversely affected. As a result, compositions can be obtained which contain less synergist, in particular less antimony compounds, while they have particularly good flame-retardant properties.

Another advantage of the composition according to the invention is that discolouration of the composition, which may for example occur during the processing of the composition at high temperatures, can be reduced, for example by reducing the amount of synergist.

From EP-A-401,740 (DuPont, USA) it is known to use polyvinyl pyrrolidone (PVP) as an additive in para-aramide fibres to obtain improved properties, in particular fibre strength, paintability, UV stability, strength after ageing under the influence of heat, and adhesion in composite materials. A fabric made from fibres prepared from about 11 wt. % PVP (relative to the total composition) and para-aramide also showed a greater resistance to heat of radiation (singeing behaviour) to which the fabric was exposed (Test Method 1971, Section 5–1, of the National Fire Protection Association (NFPA)). Said publication does not mention the composition's dripping behaviour, in particular at PVP concentrations equal to or less than 10 wt. %, relative to the total weight of the composition.

From U.S. Pat. No. 5,236,982 (Cossement et al.) it is known that PVP is used as an additive in a surface layer on glass fibres which can subsequently be mixed into a thermoplastic polymer to obtain a glass-fibre reinforced thermoplastic composition. The concentration of PVP in a composition is typically approximately 0.008 wt. % (relative to the total composition). According to the aforementioned publication, PVP is used as a lubricant to retain critical properties of the employed glass fibres, such as length and amount of fine particles.

In the context of this application an n-alkanelactam-substituted polymer is understood to be a polymer that contains a number of n-alkanelactam groups that are bound to the polymer via the N atom of the lactam. Suitable for use as the n-alkanelactam group is a group derived from an n-alkanelactam in which n is an integer and n>1, in particular an n-alkanelactam in which n is an integer and is chosen from 2 up to and including 12. More in particular the n-alkanelactam is 2-ethanelactam (azacyclopropan-2-one), 3-propanelactam (β-propiolactam), 4-butanelactam (γ-butyrolactam or 2-pyrrolidone), γ-valerolactam, 5-pentanelactam (δ-valerolactam), 3-methylvalerolactam, 6-methylvalerolactam, 6-hexanelactam (ϵ-caprolactam), 7-heptanelactam (ϕ-enantholactam, 8-octanelactam (γ-caprylolactam), 9-nonanelactam (θ-pelargolactam), 10-decanelactam (ω-caprinolactam), 11-undecanelactam or 12-dodecanelactam (ω-laurolactam).

Any aliphatic or aromatic polymer can be chosen as the polymer for the n-alkanelactam substituted polymer. In particular, the polymer is a polyolefine, for example a polyethylene, polypropene or a copolymer thereof. The n-alkanelactam groups may, independently of one another, be the same or differ per polymer molecule.

In particular, the n-alkanelactam-substituted polymer is a compound that consists of units according to Formula 1

$$—(CR_1R_2)— \quad (1)$$

where $R_1$ and $R_2$, independently of one another, are H or an n-alkanelactam group, providing that each molecule contains at least 1 n-alkanelactam group. Preferably, the n-alkanelactam-substituted polymer is polyvinyl pyrrolidone (PVP). Polyvinyl pyrrolidone is commercially available in several molecular weights as Luviskol® (BASF, Germany) and can be obtained through linear polymerization of the monomer N-vinyl-2-pyrrolidone. Polyvinyl pyrrolidone consists of units according to formula 2

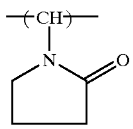

(2)

An n-alkanelactam-substituted polymer with virtually any molecular weight can be used in the composition according to the invention. The molecular weight can be used in the composition according to the invention. The molecular weight may vary in a very wide range, in particular from approximately 7,000 to approximately 2,000,000. Preferably, a molecular weight of between approximately 45,000 and approximately 2,000,000 is chosen. The amount of n-alkanelactam-substituted polymer can be freely chosen, Preferably the amount is 0.01 to 10 wt. %; preferably, the amount is 0.01 to 5 wt. %, relative to the weight of the thermoplastic polymer. N-alkanelactam-substituted polyme that contains a small amount of impurities of unreacted monomer, for example PVP with a small amount of 2-pyrrolidone, for example less than 1 wt. %, relative to the n alkanelactam-substituted polymer, is also covered by the definition of n-alkanelactam-substituted polymer according the invention.

Any thermoplastic polymer known to a person skilled in the art can be used as thermoplastic polymer (A) in the composition according to the invention. Preferably, a polycondensation polymer is chosen, in particular a polyester, a polycarbonate or a polyamide.

Examples of suitable polyesters are poly(cyclo)alkylene terephthalates or copolyesters thereof with isophthalic acid, for example polyethylene terephthalate (PET), polybutylene terephthalate (PBT), polycyclohexylene dimethylene terephthalate (PCT), polyalkylene naphthalates, for example polyethylene naphthalate (PEN), polypropylene naphthalate (PPN) and polybutylene naphthalate (PBN), polyalkylene dibenzoates, for example polyethylene dibenzoate, and copolyesters of said polyesters. Preferably, PET, PBT, PEN or PBN is chosen. Also suitable are block copolyesters which, in addition to hard polyester segments chosen from the aforementioned group, also contain soft polyester segments derived from at least a polyether or an aliphatic polyester. Examples of such block copolyesters with elastomeric properties are for example described in "Encyclopedia of Polymer Science and Engineering", Vol. 12, p. 75 ff. (1988), John Wiley & Sons, and in "Thermoplastic Elastomers", 2nd Ed., Chapter 8 (1996), Hanser Verlag, the relevant contents of which are hereby understood to have been mentioned.

Examples of a suitable polyamide are aliphatic polyamides, for example PA-6, PA-6,6, PA-9, PA-11, PA-4, 6, polyamides based on 2-methylpentamethylene diamine and adipic acid and copolyamides thereof, semi-aromatic polyamides based on aromatic dicarboxylic acids, for example isophthalic acid and terephthalic acid, and aliphatic diamines, for example hexane diamine, for example PA-6/T, PA-6.6/T, PA-6/6.T, PA-6,6/6,T, PA-6,6/6/6,T, PA-6T/6I, PA-6,6/6,I/6,T and PA-6,6/2-MPMD,6, and completely aromatic polyamides.

In particular, the thermoplastic polymer has a melting point equal to or above 280° C.

Surprisingly, it has also been found that the composition according to the invention can be processed at higher temperatures, in particular above 280° C., without noticeable chemical degradation. This makes the use of n-alkanelactam-substituted polymer in thermoplastic polymers with high melting points, for example polyamide-4,6 and semi-aromatic polyamides, particularly suitable. Preferably, the polyamide is chosen from the group comprising PA-6, PA-6,6, PA-4,6 and semi-aromatic polyamides.

The composition according to the invention comprises a flame-retardant system (B), in particular a halogen-containing system, comprising at least a halogen-containing compound. Suitable for use as the halogen-containing system are for example systems that contain halogen-containing flame retardants as the flame retardant, for example brominated polystyrene, for example Pyrochek® 68PB from Ferro Corporation (USA) and Saytex® HP7010 from Albemarle (USA), brominated polyphenylene ether, for example PO64P® from Great Lakes (USA), polydibromostyrene, for example PDBS80® from Great Lakes, polytribromostyrene, polypentabromo-styrene, polydichlorostyrene, polytrichlorostyrene, polypentachlorostyrene, polytribromo-alpha-methyl-styrene, polydibromo-p-phenylene oxide, polytribromo-p-phenylene oxide, polydichloro-p-phenylene oxide, polybromo-p-phenylene oxide, polybromo-o-phenylene oxide, pentabromobenzyl acrylate, for example FR1025® from AmeriBrom (USA), ethylene bis-tetrabromo-phtalimide, for example Saytex® BT-93W from Albemarle (USA), polybromobiphenyl, brominated phenoxy- and chlorine-containing flame retardants such as DeChlorane® (Occidental Chemical Corporation, USA) and other brominated compounds such as Saytex® 8010 from Albemarle (USA).

The flame-retardant systems may also contain a synergist. Suitable synergists are:

antimony-containing compounds, for example antimony trioxide, for example Bluestar® RG (Campine, Belgium), antimony tetraoxide, antimony pentoxide, sodium antimonate, for example Pyrobloc® SAP-2 (Cookson Specialty Additives), antimony tartrate;

zinc borate, for example Firebrake® ZB (Borax Inc., USA)

magnesium hydroxide, aluminium hydroxide, iron oxide, zinc oxide, calcium oxide and analogous substances.

In particular, the halogen-containing system contains an antimony-containing compound.

A halogen-free flame-retardant system may also be chosen as the flame-retardant system. Suitable halogen-free flame retardants are:

metal-containing compounds such as magnesium hydroxide and aluminium hydroxide;
nitrogen-containing compounds such as melamine, melamine cyanurate, melam, melem and melon;
phosphorus-containing compounds such as red phosphorus, melamine phosphate, melamine polyphosphate, for example Melapur® 200 (DSM, the Netherlands) and PMP-100® (Nissan Chemical Industries, Japan), melam polyphosphate, for example PMP-200® (Nissan Chemical Industries), melem polyphosphate, for example PMP-300® (Nissan Chemical Industries), phosphazene-based compounds and ammonium polyphosphate.

The composition according to the invention may also contain other additives known to a person skilled in the art that are customarily used in polymer compositions, providing they do not essentially detract from the invention, in particular pigments, processing aids, for example mould release agents, agents accelerating crystallization, nucleating agents, softeners, UV and heat stabilizers and the like. Other substances that promote the flame retardancy may optionally also be added, for example carbon-forming substances such as polyphenylene ether and polycarbonate and substances modifying the dripping behaviour, for example fluoropolymers such as polytetrafluoroethylene. In particular, the composition according to the invention contains an inorganic filler or reinforcing agent. Suitable for use as an inorganic filler or reinforcing agent are all the fillers known to a person skilled in the art, for example glass fibres, metal fibres, graphite fibres, aramide fibres, glass beads, aluminium silicates, asbestos, mica, clay, calcined clay and talcum. Preferably, glass fibres are chosen.

Preferably, the composition according to the invention contains

A) 40–90 wt. % of a thermoplastic polymer, to be chosen from the group comprising polyamides, polycarbonates and polyesters
B) 10–40 wt. % of a halogen-containing flame-retardant system
C) 0.1–5 wt. % polyvinyl pyrrolidone with a molecular weight between 45,000 and 2,000,000
D) 0–50 wt. % glass fibres
E) 0–20 wt. % other additives, where (A+B+C+D+E) equals 100 wt. %.

The thermoplastic composition according to the invention can be obtained in a simple way by means of melt-mixing. Preferably, use is made of an extruder fitted with means for dosing all the desired components to the extruder, either to the extruder's throat or to the melt. According to one embodiment the n-alkanelactam-substituted polymer may form part of the flame-retardant system B. In another embodiment the n-alkanelactam-substituted polymer can be fed directly to the melt separately or it can first be mixed with the polymer granules.

The composition accordingly to the invention is suitable for making any object known to the skilled person, in particular a film, a fiber, a sheet and a moulded part.

The invention will be further elucidated with reference to the following examples and comparative examples.

EXAMPLES

Examples I–XII and Comparative Examples A–E

A number of compositions were prepared using the following components:

(A) thermoplastic polymer:
- polyamide 4,6: Stanyl® KS200, DSM N.V., the Netherlands
- polyamide 6,6/6T: Grivory® FE5011, EMS Chemie. Switserland
- polyester PBT: Arnite® T04200, DSM N.V., the Netherlands
- polyamide 6: Akulon® K122, DSM N.V., the Netherlands (B) flame-retardant system:
- Pyrochek® 68PBi (brominated polystyrene—Ferro Corp., USA)
- PDBS80® (polymerized dibromostyrene—Great Lakes, USA)
- Saytex® BT-93W (ethylene bis-tetrabromo-phtalimide—Albemarle, USA)
- GR2617® ($Sb_2O_3$, as a PA-6 masterbatch, containing 80% $Sb_2O_3$—Campine, Belgium)
- GR2616® ($Sb_2O_3$, as a PBT masterbatch, containing 80% $Sb_2O_3$—Campine, Belgium)
- Saytex® HP-7010 (brominated polystyrene—Albemarle, USA)
- Saytex® 8010 (Albemarle, USA)

(C) polyvinyl pyrrolidone:
- Luviskol® K90 (BASF, Germany), $M_w$=1,200,000–2,000,000
- Luviskol® K30 (BASF, Germany), $M_w$=45,000–55,000
- Luviskol® K17 (BASF, Germany), $M_w$=7,000–11,000

Glass fibres:
- OC173X-10c® (Owens-Corning, USA)
- OC183-11c® (Owens-Corning, USA)

Lubricant: AC 540A® (Allied, USA)
Stabilizer: Irganox® 1098 (Ciba Geigy, Switzerland)
Filler: Stealene (talc, Luzenac, France)

The compositions are given in Tables 1, 3, 5, 7 and 9. All the amounts are wt. %, relative to the total composition. All the compositions were prepared in the melt.

The flame retardancy according to UL-94 (classification, total after-flame time), the dripping behaviour (expressed as number of dripping specimen) and mechanical properties of all the compositions were determined using 5 specimen rods. The results are summarized in Tables 2, 4, 6, 8 and 10. The spiral flow was determined as the length of a polymer flow in a flat spiral with a width of 15 mm and a cross-section of 1 mm mounted on an Arburg CMD injection-moulding machine at an effective pressure of 900 bar.

Discussion

Comparison of Comparative Example A with Examples I, II and III shows that a small amount of PVP in the composition according to the invention leads to a substantial reduction in the total after-flame time (of up to 50%) and total absence of dripping. The mechanical properties, in particular the modulus of elasticity, tensile strength, elongation-at-break, notched impact resistance and spiral flow, remain unchanged or improve, in particular the tensile strength.

Examples X, XI and XII (Tables 7 and 8) illustrate that the flame retardancy effect according to the invention does not depend on the molecular weight of the PVP. For low molecular weights however, in particular lower than 10,000, the concentration can be increased, a combination of molecular weight and concentration which can be selected by a skilled person by simple optimisation. When Experiment XII was repeated with a concentration of 6 weight %, the flame retardancy properties were comparable with those of Example X and XI.

TABLE 1

| PA-4, 6 compositions | | | | | | | | | | |
|---|---|---|---|---|---|---|---|---|---|---|
| Component | A | I | II | III | B | IV | V | C | VI | VII |
| Polymer | | | | | | | | | | |
| Stanyl ® KS200 | 42.74 | 42.49 | 42.24 | 41.74 | 41.00 | 43.00 | 44.00 | 32.84 | 34.64 | 35.59 |
| Flame-retardant | | | | | | | | | | |
| Pyrochek ® 68PBi | 18.75 | 18.75 | 18.75 | 18.75 | — | — | — | — | — | — |
| PDBS80 ® | — | — | — | — | 21.00 | 21.00 | 21.00 | 19.50 | 19.50 | 19.50 |
| GR2617 ® | 7.81 | 7.81 | 7.81 | 7.81 | 7.50 | 5.00 | 3.75 | 7.00 | 4.70 | 3.50 |
| PVP | | | | | | | | | | |
| Luviskol ® K90 | — | 0.25 | 0.50 | 1.00 | — | 0.50 | 0.75 | — | 0.50 | 0.75 |
| Glass fibre | | | | | | | | | | |
| OC 173X-10c ® | 30 | 30 | 30 | 30 | 30 | 30 | 30 | 40 | 40 | 40 |
| Lubricant and stabilizer | 0.70 | 0.70 | 0.70 | 0.70 | 0.50 | 0.50 | 0.50 | 0.66 | 0.66 | 0.66 |

TABLE 2

| Properties of the compositions of Table 1 | | | | | | | | | | | | |
|---|---|---|---|---|---|---|---|---|---|---|---|---|
| Property | Unit | ISO | A | I | II | III | B | IV | V | C | VI | VII |
| Mechanical properties | | | | | | | | | | | | |
| Modulus of elasticity | GPa | 527/1A | 11.6 | 11.5 | 11.4 | 11.6 | 11.3 | 11.3 | 11.3 | 15.0 | 15.4 | 15.4 |
| Tensile strength | MPa | 527/1A | 172 | 183 | 179 | 181 | 150 | 165 | 176 | 161 | 180 | 186 |
| Elongation-at-break | % | 527/1A | 2.3 | 2.4 | 2.3 | 2.2 | 1.8 | 1.9 | 2.1 | 1.5 | 1.6 | 1.7 |
| Notched impact resistance (IZOD) | $kJ/m^2$ | 180/1A | 10.6 | 10.4 | 10.3 | 9.3 | 12.2 | 11.5 | 11.6 | 15.7 | 13.9 | 16.1 |
| Spiral flow (900 bar) | mm | | 102 | 95 | 103 | 100 | 127 | 128 | 127 | 115 | 113 | 117 |
| UL94V 0.8 mm thick | | | | | | | | | | | | |
| Specimen 125 × 13 × 0.8 mm | | | | | | | | | | | | |
| 48 hours/23° C./50% R.H. | | | | | | | | | | | | |
| Classification | sec. | | V0 | V0 | V0 | V0 | V0 | V0 | V0 | V0 | V0 | V0 |
| Total after-flame time | | | 21 | 13 | 10 | 10 | 24 | 23 | 28 | 10 | 10 | 9 |
| Dripping specimens | | | 1 | 0 | 0 | 0 | 4 | 0 | 0 | 0 | 0 | 0 |
| 168 hours/70° C. | | | | | | | | | | | | |
| Classification | sec. | | V0 | V0 | V0 | V0 | V0 | V0 | V0 | V0 | V0 | V0 |
| Total after-flame time | | | 23 | 24 | 12 | 12 | 31 | 16 | 39 | 10 | 10 | 10 |
| Dripping specimen | | | 1 | 0 | 0 | 0 | 5 | 0 | 0 | 0 | 0 | 0 |

Comparison of Comparative Example B with Examples IV and V, of Comparative Example C with Examples VI and VII, of Comparative Example D with Example VIII and of Comparative Example E with Example IX shows that when the synergist concentration is lowered in the presence of an amount of PVP, the mechanical properties, in particular the tensile strength and the elongation-at-break, increase, whereas the total after-flame time remains more or less unchanged; dripping is completely absent with these compositions according to invention, too.

TABLE 3

| PA-6, 6/6T compositions | | |
|---|---|---|
| Component | D | VIII |
| Polymer | | |
| Grivory ® FE5011 | 42.87 | 42.27 |

TABLE 3-continued

| PA-6, 6/6T compositions | | |
|---|---|---|
| Component | D | VIII |
| Flame-retardant | | |
| Pyrochek ® 68PBi | 18.75 | 18.75 |
| GR2617 ® | 7.81 | 3.91 |
| PVP | | |
| Luviskol ® K90 | — | 0.50 |
| Glass fibre | | |
| OC 173X-10c ® | 30 | 30 |
| Lubricant and stabilizer | 0.57 | 0.57 |

TABLE 4

| Properties of the compositions of Table 3 | | | | |
|---|---|---|---|---|
| Property | Unit | ISO | D | VIII |
| Mechanical properties | | | | |
| Modulus of elasticity | GPa | 527/1A | 12.5 | 12.4 |
| Tensile strength | MPa | 527/1A | 178 | 188 |
| Elongation-at-break | % | 527/1A | 2.0 | 2.1 |
| Notched impact resistance (IZOD) | $kJ/m^2$ | 180/1A | 10.1 | 10.1 |
| Spiral flow (900 bar) | mm | | 120 | 120 |
| UL94V 0.8 mm thick<br>Specimen 125 × 13 × 0.8 mm<br>48 hours/23° C./50% R.H. | | | | |
| Classification | sec. | | V0 | V0 |
| Total after-flame time | | | 10 | 14 |
| Dripping specimens | | | 1 | 0 |
| 168 hours/70° C. | | | | |
| Classification | sec. | | V0 | V0 |
| Total after-flame time | | | 10 | 10 |
| Dripping specimen | | | 0 | 0 |

TABLE 5

| PBT-compositions | | |
|---|---|---|
| Component | E | IX |
| Polymer | | |
| Arnite ® T04200 | 56 | 57.5 |
| Flame-retardant | | |
| Saytex ® BT-93W | 9 | 9 |
| GR2616 ® | 5 | 2.5 |
| PVP | | |
| Luvisko1 ® K90 | — | 1.0 |
| Glass fibre | | |
| OC 183-11c ® | 30 | 30 |

TABLE 6

| Properties of the compositions of Table 5 | | | | |
|---|---|---|---|---|
| Property | Unit | ISO | E | IX |
| UL94V 2 mm thick<br>Specimen 125 × 13 × 2 mm<br>48 hours/23° C./50% R.H. | | | | |
| Classification | sec. | | V0 | V0 |
| Total after-flame time | | | 10 | 10 |
| Dripping specimens | | | 0 | 0 |
| 168 hours/70° C. | | | | |
| Classification | sec. | | V0 | V0 |
| Total after-flame time | | | 10 | 10 |
| Dripping specimen | | | 0 | 0 |

TABLE 7

| PA-4, 6 compositions with different amounts of PVP | | | |
|---|---|---|---|
| Component | X | XI | XII |
| Polymer | | | |
| Stanyl ® KS200 | 44 | 44 | 44 |
| Flame-retardant | | | |
| PDBS80 ® | 21 | 21 | 21 |
| GR2617 ® | 3.75 | 3.75 | 3.75 |
| PVP | | | |
| Luviskol ® K90 | 0.75 | — | — |
| Luviskol ® K30 | — | 0.75 | — |
| Luviskol ® K17 | — | — | 0.75 |
| Glass fibre | | | |
| OC 173X-10c ® | 30 | 30 | 30 |
| Lubricant and stabilizer | 0.50 | 0.50 | 0.50 |

TABLE 8

| Properties of the compositions of Table 7 | | | | | |
|---|---|---|---|---|---|
| Property | Unit | ISO | X | XI | XXI |
| Mechanical properties | | | | | |
| Modulus of elasticity | GPa | 527/1A | 11.2 | 11.1 | 11.2 |
| Tensile strength | MPa | 527/1A | 181 | 181 | 174 |
| Elongation-at-break | % | 527/1A | 2.2 | 2.3 | 2.1 |
| Notched impact resistance (IZOD) | $kJ/m^2$ | 180/1A | 11.1 | 10.9 | 11.8 |
| UL94V 0.8 mm thick<br>Specimen 125 × 13 × 0.8 mm<br>48 hours/23° C./50% R.H. | | | | | |
| Classification | sec. | | V0 | V0 | V0 |
| Total after-flame time | | | 22 | 28 | 55 |
| Dripping specimens | | | 0 | 0 | 5 |
| 168 hours/70° C. | | | | | |
| Classification | sec. | | V0 | V0 | V2 |
| Total after-flame time | | | 22 | 24 | 51 |
| Dripping specimen | | | 1 | 0 | 5 |

TABLE 9

| | PA-6 compositions | | | |
|---|---|---|---|---|
| Component | F | XIII | G | XIV |
| Polymer | | | | |
| Akulon ® K122 | 44.45 | 46.02 | 53.1 | 54.65 |
| Flame-retardant | | | | |
| Saytex ® HP7010 | 20.6 | 20.6 | — | — |
| Saytex ® 8010 | — | — | 12 | 12 |
| GR 2617 ® | 4.15 | 2.08 | 4.1 | 2.05 |
| PVP | | | | |
| Luviskol ® K90 | — | 0.5 | — | 0.5 |
| Glassfibre | | | | |
| OC 173X-10c ® | 30 | 30 | — | — |
| Filler | | | | |
| Stealene | — | — | 30 | 30 |
| Other additives | 0.8 | 0.8 | 0.8 | 0.8 |

TABLE 10

| Properties of the compositions of Table 9 | | | | | | |
|---|---|---|---|---|---|---|
| Component | Unit | Iso | F | XIII | G | XIV |
| Mechanical properties | | | | | | |
| Modulus of elasticity | GPa | 527/1A | 10.7 | 11.6 | 7.4 | 7.5 |
| Tensile strength | MPa | 527/1A | 148 | 152 | 69 | 66 |
| Elongation at break | % | 527/1A | 2.5 | 2.2 | 1.6 | 1.3 |
| Notched impact resistance (Izod) | Kj/m$^2$ | 180/1A | — | — | — | — |
| UL 94V 0.8 mm thick Specimen 125 × 13 × 0.8 mm 48 hours/23° C./50% R.H. | | | | | | |
| Classification | sec. | | V0 | V0 | V2 | V2 |
| Total after-flame time (5 specimen rods) | | | 45 | 10 | 13 | 20 |
| Number of specimens that show dripping | | | 100% | 100% | 100% | 100% |
| 168 hours/70° C. | | | | | | |
| Classification | Sec. | | V0 | V0 | V2 | V2 |
| Total after-flame time (5 specimen rods) | | | 38 | 10 | 15 | 18 |
| Number of specimens that show dripping | | | 100% | 100% | 100% | 100% |

What is claimed is:

1. Flame-retardant thermoplastic polyamide composition that comprises at least (A) a thermoplastic polyamide polymer, (B) a flame-retardant system, and (C) 0.01–10 wt, % relative to the total composition, of an n-alkanelactam-substituted olefin polymer, whew a represents an integer from 2 to 12.

2. Flame-retardant thermoplastic composition according to claim 1, comprising from 0.1 to 5 wt % of said n-alkanelactam-substituted olefin polymer.

3. Flame-retardant thermoplastic polyamide composition according to claim 1, wherein the weight-average molecular weight, Mw, of the n-alkanelactam-substituted olefin polymer is between 7,000 and 2,000,000.

4. Flame-retardant thermoplastic polyamide composition comprising (A) a thermoplastic polyamide polymer, (B) a flame-retardant system, and (C) 0.01–10 wt %. relative to die total composition of polyvinyl pyrrolidone.

5. Flame-retardant thermoplastic polyamide composition according to claim 1, wherein the thermoplastic polyamide is PA6, PA6,6, PA 4,6 or a semi-aromatic polyamide.

6. Flame-retardant thermoplastic polyamide composition according to claim 1, wherein the flame-retardant system comprises at least a halogen-containing compound and an antimony-containing compound.

7. Flame-retardant thermoplastic polyamide composition according to claim 1, further comprising a filler.

8. Flame-retardant thermoplastic composition according to claim 7, wherein the filler comprises glass fiber.

9. Flame-retardant thermoplastic composition according to claim 1, wherein the flame-retardant system comprises a halogen-free flame retardant.

10. Flame-retardant thermoplastic composition according to claim 9, wherein the halogen-free flame retardant comprises a metal-containing flame retardant, a nitrogen-containing flame retardant, or a phosphorus-containing flame retardant.

11. Halogen containing flame-retardant thermoplastic composition comprising

A) 40–90 wt. % of thermoplastic polyamide;

B) 10–40 wt. % of halogen-containing flame retardant system

C) 0.1–5 wt. % polyvinyl pyrrolidone with a weight-average molecular weight, Mw, between 45,000 and 2,000,000;

D) 0–50 wt. % glass fibers; and

E) 0–2 wt. % other additives which are not the same as A, B, C, or D, where (A+B+C+E) amounts to 100 wt. %.

12. Film, fiber or molded part obtained using the composition of claim 11.

13. Film, fiber or molded part obtained using the composition of claim 1.

14. Flame-retardant thermoplastic polyamide composition comprising (A) thermoplastic polyamide polymer, (B) halogen-free flame retardant, (C) n-alkanelactam-substituted olefin polymer, wherein n represents an integer from 2 to 12, and, optionally (D) flame-retardant synergist; and optionally, (E) one or more other polymer additives.

15. Composition according to claim 14, wherein the flame-retardant synergist (D) is present and is antimony trioxide, antimony tertaoxide, antimony pentaoxide, sodium antimonate, antimony tartrate, zinc borate, magnesium hydroxide, aluminum hydroxide, iron oxide, zinc oxide, or calcium oxide.

16. Composition according to claim 14, wherein the halogen-free flame retardant is magnesium hydroxide, aluminum hydroxide, melamine, melamine cyanurate, melam, melem, melon, red phosphorus,melamine phosphate, melamine polyphosphate, melam polyphoshate, melem polyphosphate, phosphazine-based flame retardant compounds or ammonium polyphosphate.

17. Film, fiber, or molded part obtained using the composition of claim 16.

* * * * *